Aug. 17, 1926.
G. LINLAUD
1,596,670
COMBINATION LOCK
Filed March 19, 1924    2 Sheets-Sheet 1
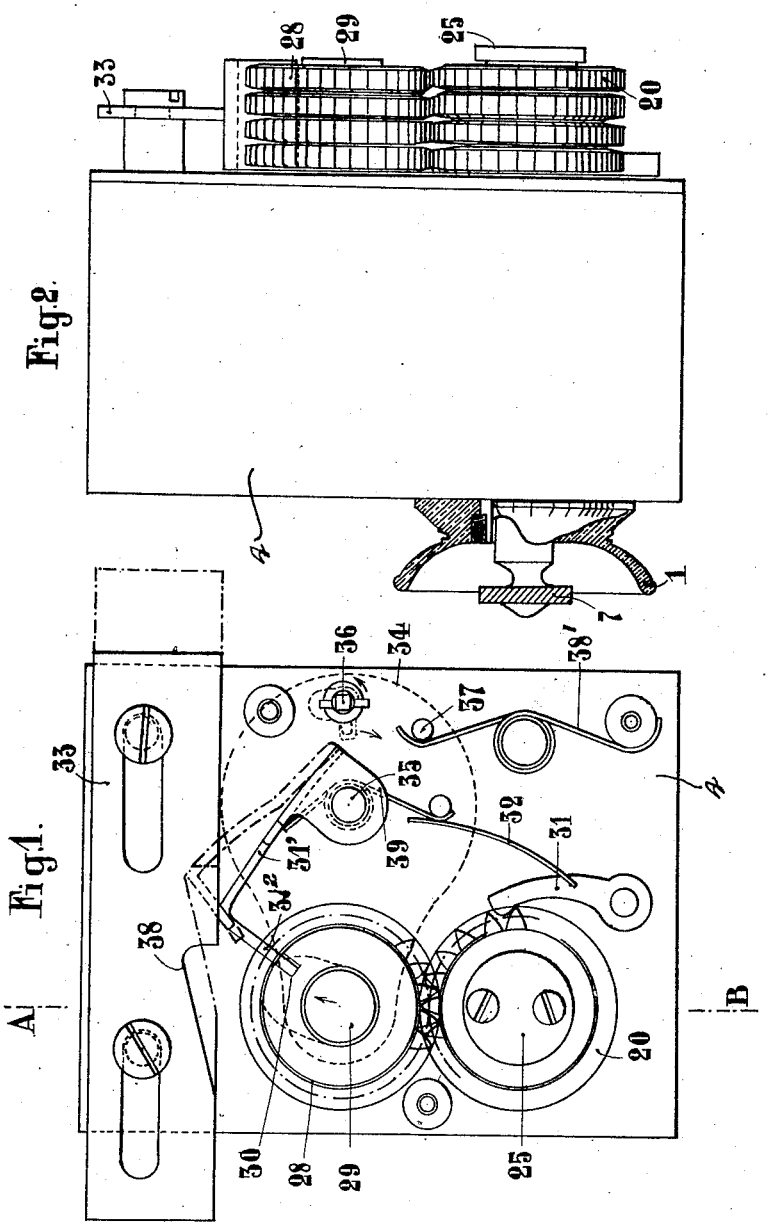
INVENTOR
Guillaume Linlaud
BY
ATTORNEY Aug. 17, 1926.
G. LINLAUD
1,596,670
COMBINATION LOCK
Filed March 19, 1924      2 Sheets-Sheet 2
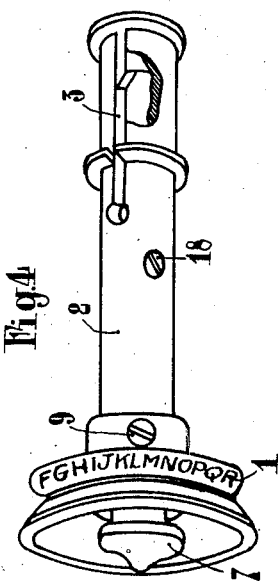
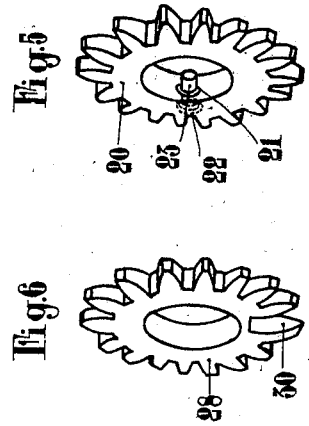
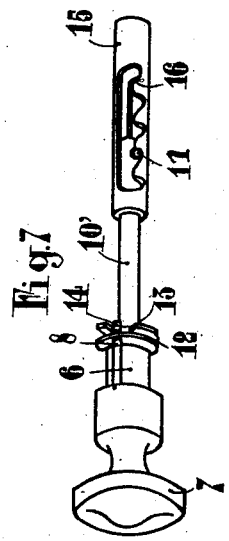
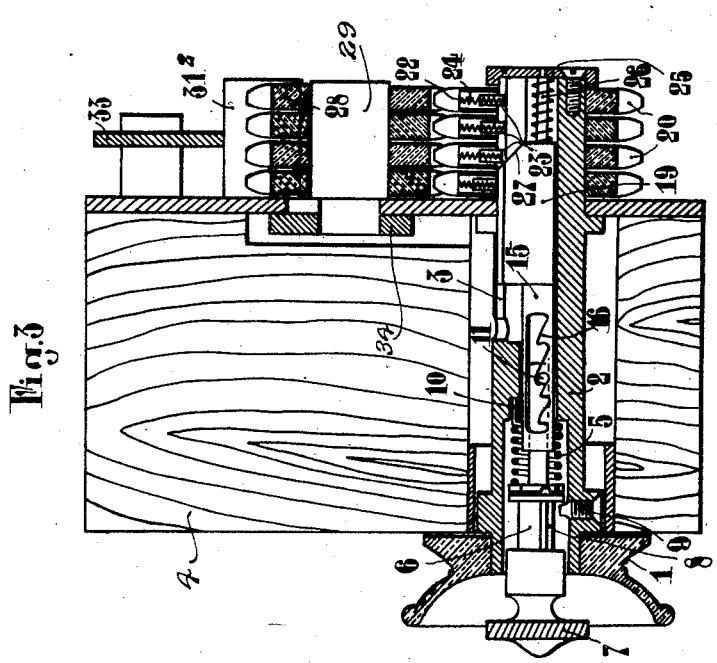
INVENTOR:
Guillaume Linlaud
BY
ATTORNEY Patented Aug. 17, 1926.

1,596,670

UNITED STATES PATENT OFFICE.

GUILLAUME LINLAUD, OF PARIS, FRANCE.

COMBINATION LOCK.

Application filed March 19, 1924, Serial No. 700,357, and in France January 23, 1924.

The object of my invention is to provide, for strong boxes and such like, a combination lock comprising a double set of gears and with which it will be impossible for any person uninformed of the combination to work out the latter as is the case with a number of hitherto known locks.

In order to make my invention more clearly understood, I have illustrated as an example an embodiment thereof in and by drawings appended hereto and wherein:

Figure 1 is a view of the rear face of my lock;

Figure 2 is a side view of Figure 1;

Figure 3 is a vertical section on line A—B of Figure 1;

Figure 4 is a perspective view of the operating knob and of its stem;

Figure 5 is a perspective view of one of the permutation wheels;

Figure 6 is a perspective view of one of the bolt-release wheels; and

Figure 7 shows the auxiliary knob, its stem and its rack permitting the combination wheels to be unlocked.

In principle I provide the main knob 1 of the strong box with an extension formed by a hollow stem 2 slotted at 3 and adapted to be driven into the door 4 of the strong box. Within the stem 2 is arranged a spiral spring 5, one end 10 of which is fixed in a notch or seat in said stem, and through this spring is inserted the stem 6 of a concentric releasing knob 7. Stem 6 carries a tongue 8 which, when said stem is positioned within stem 2, limits the latter's rotation in either direction relative to knob 1 by coming into engagement with a screw 9 passing through stem 2. Stem 6 is prolonged by a rotatable central spindle $10^1$ fitted with a spur 11 and with a collar 12 notched at 13, the ends of the said notch coming into contact with the projecting end 14 of the tongue 8 on stem 6 and limiting thereby the rotary displacement of stems 6 and 10' relative to one another. The opposite end of the spring 5 is suitably engaged with said collar 12, so that the tendency of the spring is always to rotate knob 7 clockwise. Stem 10' is capped with a sleeve 15 formed with a rack slot 16 the teeth of which receive spur 11. Sleeve 15 has, opposite to the rack, a second slot (not shown) to receive the end of a screw 18 which is set into stem 2, whereby it is prevented from revolving within stem 2 but not from moving longitudinally. Within slot 3 is adapted to slide a releasing member 19 controlled by the action of sleeve 15 against which it abuts. The portion of stem 2 that protrudes inside the strong box's door serves as a spindle for the toothed permutation wheels 20 each of which is pierced with a radial hole 21 having an extension 22, and within said hole is arranged a spur 23 constantly pushed by a spring 24 into slot 3. Secured to the end of stem 2 is a washer 25, carrying a spring 26, which washer maintains wheels 20 in place on said stem. Spring 26 bears on slide 19 and tends to push it constantly out of contact with spurs 23; said slide having at its end a guide surface 27 along which the spurs are adapted to ride the upper part of the said guide surface terminating flush with the periphery of stem 2. Each permutation wheel 20 gears with a releasing wheel 28 arranged on a common spindle 29 and provided with a deep notch 30, the wheels 20 being kept in position by check pawls 31 controlled by a spring or springs 32, so that some effort is necessary to rotate the wheels.

The operation of my lock is as follows:

First I bring the notches 30 in all the releasing wheels 28 into line with the bent edge or tip $31^2$ of a locking member or detent 31' which is engaged in a notch 38 in the sliding bolt 33 when the latter is projected, and is pivotally mounted on a spindle 35. This leaves the bolt free to be retracted, since the inclined edge of said slot will cam or rock the detent $31^7$ counter clockwise during the rearward movement of said bolt, thereby causing its nose or tip $31^2$ to move into notches 30. At this moment the rack 16 occupies its extreme leftward or outward position, in which the spur 11 is set in the last tooth of the rack towards the inside of the strong box. This leaves the slide 19 clear of all the spurs 23 which are thus free to project into slot 3 in stem 2, so that the wheels 20 are thus locked to said stem. I then revolve knob 1, so as to bring one of the letters or figures stamped on its outer collar opposite a mark on the door. Next, by pushing inward knob 7, I render idle the first permutation wheel 20 whose spur, sliding up the guide surface 27 on slide 19, gets released from slot 3.

The first permutation wheel 20 thus released is idle on the stem 2 and is kept in place by its pawl 31. Afterwards the knob 1 is again rotated to bring another letter or figure in front of the mark and the knob 7 is again pushed inward in order to release the second wheel 20 from the stem 2 and so on with all the permutation wheels 20 of the mechanism.

Since during these combination setting operations, the releasing wheels 28 are locked by detent 31' and therefore cannot revolve, I throw them out of gear with the corresponding permutation wheels 20. For this purpose, their spindle 29 is mounted in a carrier 34 pivoted on the spindle 35 and adapted to be moved by means of a square key set on a spindle 36 in an already known manner. Carrier 34 is provided at the opposite end of spindle 29 with a spur 37 influenced by a spring 38' which tends to return wheels 20 and 28 into gear.

Having set or established the combination as above indicated, I bring the releasing wheels 28 again into gear with the permutation wheels 20, and I then shoot the bolt 33, whereupon the detent 31', pushed by its antagonistic spring 39, moves into the notch 38 in the bolt and releases wheels 28. I then release spur 11 from the rack teeth by revolving knob 7 anticlockwise and the rack is thrown back or toward the left by the releasing member 19 influenced by its spring 26. By revolving knob 1 and its stem 2 next all the spurs 23 are reengaged in slot 3 and the combination can be jumbled. In order to open the lock I have but to effect in the same sequence the movements indicated for setting the combination.

As will be readily understood the notches 30 are thereby brought opposite the part $31^2$ of the detent 31' which, sliding down the inclined guide surface 38' of the bolt during the retraction of the latter and thus dropping into the said notches, permits the strong box to be opened.

I wish it to be clearly understood that I do not intend to limit my invention to the precise structural details above described, but that modifications and changes may be made without departing from its spirit and scope as claimed.

Having now particularly ascertained and described the nature of my said invention as well as a manner in which the same is to be performed, I declare that what I claim is :

1. In a permutation lock, the combination of a bolt; a detent engageable with the bolt to hold it in projected position; a set of wheels directly associated with the detent and movable into releasing position with respect thereto, to enable the bolt to be retracted; a set of permutation wheels in mesh with the releasing wheels to rotate the same; a check pawl associated with each permutation wheel; a rotatable setting stem whereon the permutation wheels are mounted, provided with a longitudinal slot; a spring-pressed spur slidably mounted in the inner peripheral wall of each permutation wheel for automatic engagement in the stem slot when brought into line therewith so as to couple the stem and wheel together to rotate in unison; and means for disengaging the spurs of the successive permutation wheels from said slot to enable the stem to be rotated with relation to the wheels thus disengaged.

2. A permutation lock according to claim 1, in which the rotatable setting stem is hollow, and the spur-disengaging means is mounted for endwise movement in the bore thereof.

3. A permutation lock according to claim 1, in which the rotatable setting stem is hollow, and the spur-disengaging means comprises an endwise-movable slide mounted in the bore of said stem to engage the ends of the spurs and force them out of the slot, and a stem for operating said slide disposed axially within the setting stem and provided at its outer end with a push-button.

4. A permutation lock according to claim 1, in which the rotatable setting stem is hollow, and the spur-disengaging means is mounted for endwise movement in the bore thereof and comprises a two-part element having a lost-motion connection between its parts to enable relative movement between them, and a spur-engaging member operated by said element.

5. A permutation lock according to claim 1, in which the rotatable setting stem is hollow, and the spur-disengaging means is mounted for endwise movement in the bore thereof and comprises a two-part element embodying a hollow, tubular rack and a stem fitting in said rack to move endwise therein and having a stud to engage the successive teeth thereof, and a spur-engaging element operated by said rack.

6. In a permutation lock, the combination of a bolt, a set of notched releasing wheels, a detent extending directly between the peripheries of said wheels and the adjacent edge of the bolt; said bolt edge having a notch therein, and said detent being movable in one direction to enter said notch when the bolt is projected so as to lock it against retraction, and being movable in the other direction to withdraw it from the bolt notch and engage it in the wheel notches so as to permit the retraction of the bolt; a set of permutation wheels meshing with the releasing wheels and adapted to rotate the same to bring their notches into a position of alinement for engagement by said detent, and a rotatable stem whereon the permutation wheels are mounted to be set individually by the rotation thereof.

In testimony whereof I affix my signature.

GUILLAUME LINLAUD.